UNITED STATES PATENT OFFICE.

JOHN H. BLUME AND CHRISTOPHER LOVING, OF WALHALLA, TEXAS, ASSIGNORS TO JOHN H. BLUME & CO., OF SAME PLACE.

TOPICAL REMEDY.

SPECIFICATION forming part of Letters Patent No. 436,014, dated September 9, 1890.

Application filed February 21, 1890. Serial No. 341,321. (No Specimens.)

*To all whom it may concern:*

Be it known that we, JOHN H. BLUME and CHRISTOPHER LOVING, citizens of the United States, residing at Walhalla, in the county of Fayette and State of Texas, have invented certain new and useful Improvements in Medical Compounds; and we do hereby declare that the following is a full, clear, and exact description of the invention, which will enable others skilled in the art to which it appertains to make and use the same.

This invention relates to medical compounds; and it has for its object to produce a compound of this character for the local treatment of rheumatism, neuralgia, paralysis, and gout.

The composition consists of the following ingredients, combined in about the following proportions: Fox-grape, (*Vitis labrusca*,) one ounce avoirdupois; cotton-seed oil, (oleum gossypii,) eight ounces (apothecary;) sassafras-oil, (oleum sassafras,) ten drops.

In compounding the medicine, the fox-grape root is boiled in the cotton-seed oil until the strength is extracted from the former, and to this mixture is added the sassafras-oil.

In using the above composition a sufficient quantity for one application is warmed, and the affected portions of the body rubbed with a woolen cloth, which has first been thoroughly satuated with the medicine.

The vine and root of the fox-grape are covered by a series of two or more barks, the outer bark serving as a protection to the next or second bark. The latter is the part employed in our compound. This second bark comprises minute particles resembling hairs, which when the liniment is used penetrate the skin and facilitate the entrance of the compound. These particles are extracted from the bark by boiling in the cotton-seed oil. The bark used further possesses diuretic properties.

We claim as our invention—

1. The herein-described liniment, comprising fox-grape root and cotton-seed oil, combined in substantially the proportions specified.

2. The herein-described liniment, consisting of fox-grape root, cotton-seed oil, and sassafras-oil, combined in substantially the proportions specified.

In testimony whereof we affix our signatures in presence of two witnesses.

JOHN H. BLUME.
CHRISTOPHER LOVING.

Witnesses:
P. MEERSCHEIDT,
JOHN P. EHLINGER.